United States Patent [19]

Dimitriev

[11] Patent Number: 5,602,427
[45] Date of Patent: Feb. 11, 1997

[54] VEHICLE LIGHTING SWITCH

[76] Inventor: Risto E. Dimitriev, 100 Gowan Avenue, Apt. #701, Toronto, Ontario, Canada, M4K 2E2

[21] Appl. No.: 508,962

[22] Filed: Jul. 28, 1995

[51] Int. Cl.$^6$ ....................................................... B60Q 1/04
[52] U.S. Cl. ........................... 307/10.8; 315/82; 340/457; 340/458; 439/36
[58] Field of Search ................................... 307/9.1, 10.1, 307/10.6, 10.7, 10.8; 315/77, 82, 83, 84; 362/36, 83.3, 67; 200/6 R, 6 A, 11 R, 16 R, 5 R; 340/457, 458, 461; 439/36

[56] References Cited

U.S. PATENT DOCUMENTS

| | | | |
|---|---|---|---|
| 2,076,074 | 4/1937 | Douglas | 307/10.8 |
| 2,773,249 | 12/1956 | Santis | 340/457 |
| 2,913,589 | 11/1959 | Bell | 307/10.6 |
| 3,341,736 | 9/1967 | Fortney | 315/82 |
| 3,348,095 | 10/1967 | Gold | 315/80 |
| 3,373,312 | 3/1968 | Conn | 315/83 |
| 3,389,296 | 6/1968 | Carruth | 315/77 |
| 3,544,838 | 12/1970 | Carruth et al. | 315/83 |
| 3,932,788 | 1/1976 | Groover | 307/10.8 |
| 3,983,355 | 9/1976 | Hyodo | 200/16 R |
| 4,010,380 | 3/1977 | Bailer | 315/82 |
| 4,150,356 | 4/1979 | Kosuge | 340/461 |
| 4,301,390 | 11/1981 | Earle | 315/82 |
| 4,896,075 | 1/1990 | Earle | 315/82 |
| 4,965,461 | 10/1990 | McRoberts, Jr. et al. | 307/10.8 |
| 4,983,883 | 1/1991 | Roland | 315/77 |
| 5,053,677 | 10/1991 | Sanner et al. | 315/77 |
| 5,182,494 | 1/1993 | Segaud | 315/80 |
| 5,250,850 | 10/1993 | Pace et al. | 307/10.8 |
| 5,442,527 | 8/1995 | Wichelt | 315/83 |
| 5,491,311 | 2/1996 | Muscat | 200/5 R |

Primary Examiner—William M. Shoop, Jr.
Assistant Examiner—Peter Ganjoo
Attorney, Agent, or Firm—Merek & Voorhees

[57] ABSTRACT

A lighting switch for use in a vehicle lighting system that comprises a switch housing, a plurality of electrical contacts on the switch housing and a manually operable contact engaging means. The manually operable contact engaging means, when in a first position, prevents electrical energy from flowing to either the headlights or the parking lights; when in a second position, permits electrical energy to flow from the battery to the parking lights with the headlights being electrically isolated from the battery and the ignition switch; and, when in a third position, permits electrical energy to flow from the ignition switch to the headlights and parking lights such that when the ignition switch is turned off no electrical energy flows to either the headlights or parking lights.

13 Claims, 7 Drawing Sheets

VEHICLE LIGHTING SWITCH

FIELD OF THE INVENTION

This invention relates to lighting switches for controlling the headlights and parking lights of a vehicle, and more particularly to an improved lighting switch which helps to prevent the accidental discharge of a vehicle's battery through inadvertently leaving its lights on.

BACKGROUND OF THE INVENTION

The draining of an automobile battery through inadvertently leaving the automobile lights in their on position is a problem that has plagued motorists since practically the time the automobile was invented. Through haste and oversight motorists commonly leave their vehicles without turning their lights off, only to return to find their vehicle with a dead battery. The recent popularity of timers and daytime running light mechanisms for headlights have only added further to this problem on account of motorists mistakenly believing that their automobile headlights remain on due to the operation of such timers or running lights.

Others have developed numerous mechanisms and lighting systems in an attempt to combat this problem. Such devices include warning chimes, to indicate that a vehicle's lights remain on after the ignition key has been removed, and complex relays and electronic circuitry that prevent a vehicle's lights from remaining on when the ignition has been turned off. While warning chimes provide an audible indicator they do not actively prevent a vehicle's lights from being left on. Chimes only provide limited assistance and suffer from inherent problems. First, since they comprise electronic components they are susceptible to failure. Secondly, in some instances background noise is sufficient to prevent a motorist from realising that the warning chimes are in operation. In the case of individuals with hearing impairment, the warning chimes may serve no purpose whatsoever.

With respect to the use of other electronic components (which may include relays and similar devices) to ensure that headlights do not remain on, they too suffer from inherent problems. First and foremost is the fact that such a systems usually involve relatively complex electrical and electronic circuitry and components, any part of which is subject to failure. In the event that any aspect of such a system fails a motorist may not be aware that the system is no longer working properly and falsely rely upon it to ensure that the automobile headlights are turned off. Furthermore, in the event of failure of part of the system, the cost of locating the failed component and fixing the system can often be very significant. Finally, as the complexity of such electronic systems increases so do the overall vehicle costs.

SUMMARY OF THE INVENTION

The invention therefore provides a vehicle lighting switch which overcomes the disadvantages of the prior art through incorporation of a structure which is inherently simple to operate, inexpensive and not susceptible to the types of failures that may occur with prior art devices. The invention has the further advantage that it can be readily installed in existing vehicles with minimal effort and expense. In addition, depending upon the preference of motorists and vehicle manufacturers, the switch of the present invention may be constructed in any one of the three primary switch configurations used to operate automobile lighting system, namely, a rocker arm switch, a rotary knob or a plunger switch.

Accordingly, the present invention in one of its aspects provides A lighting switch for use in a vehicle lighting system, said vehicle lighting system including headlights, parking lights, an ignition switch, a storage battery and wire means connecting said lighting switch, headlights, parking lights, ignition switch and battery together in a circuit, the lighting switch comprising; a switch housing; a plurality of electrical contacts on said switch housing, at least one separate electrical contact being electrically bonded to each of said vehicle headlights, parking lights, ignition switch and battery such that said headlights and said parking lights are electrically isolated from one another and from said ignition switch and said battery; and, a manually operable contact engaging means having a first position, a second position and a third position, movement of said manually operable contact engaging means between said first, second and third positions creating and breaking electrical connections between said electrical contacts; wherein said manually operable contact engaging means, when in said first position, prevents electrical energy from flowing to said headlights or said parking lights, said manually operable contact engaging means, when in said second position, permits electrical energy to flow from said battery to said parking lights with said headlights being electrically isolated from said battery and said ignition switch and, said manually operable contact engaging means, when in said third position, permits electrical energy to flow from said ignition switch to said headlights and said parking lights such that when said ignition switch is turned off no electrical energy flows to either said headlights or said parking lights.

In another aspect of the present invention the lighting switch is attached to said vehicle by way of a switch mounting plate, said switch mounting plate including electrically conductive posts and receptacles that mesh with corresponding electrically conductive posts and receptacles on said switch housing thereby securing said switch housing to said switch mounting plate.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 8:
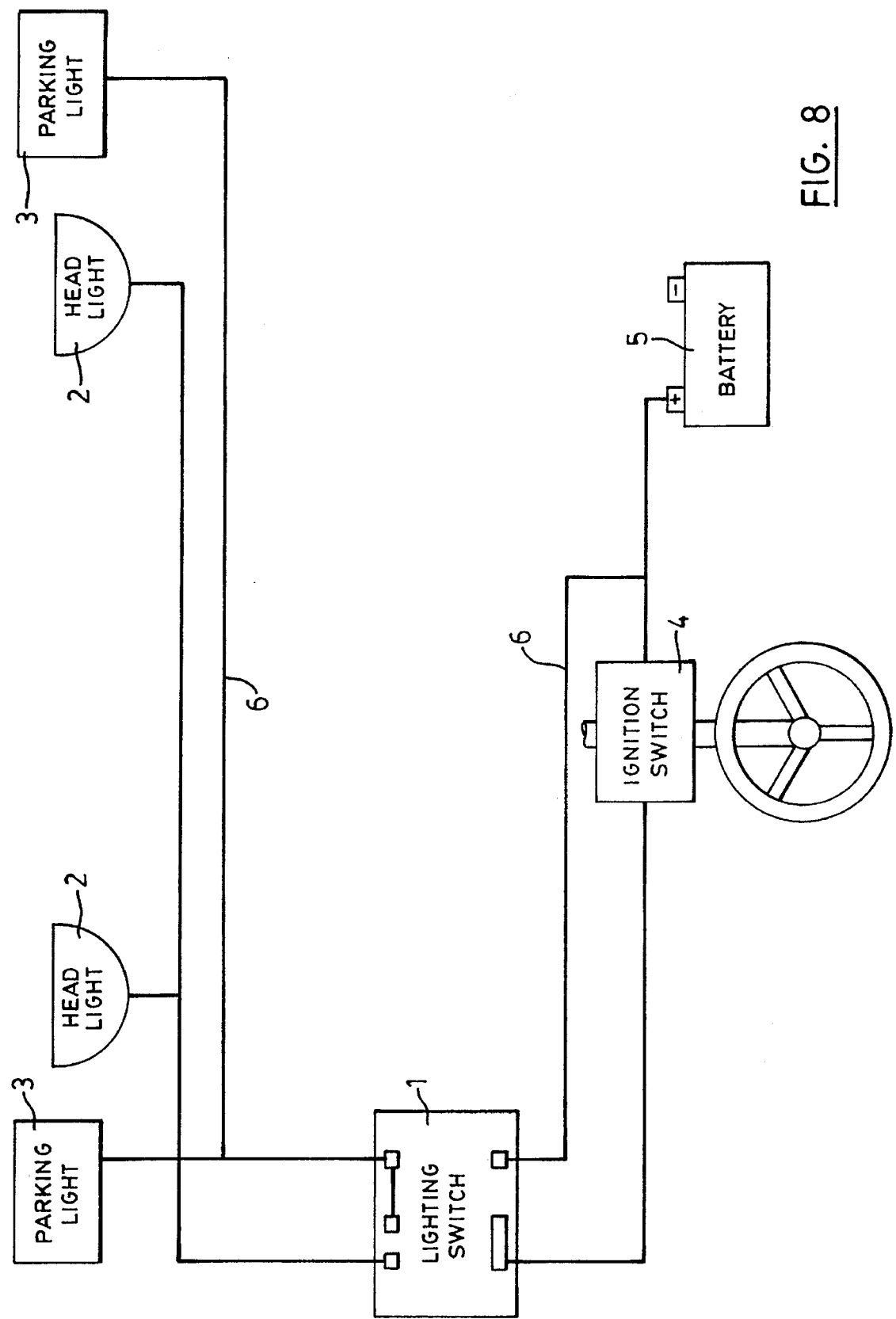
FIG. 8 is a schematic drawing showing a vehicle lighting system containing a switch pursuant to the present invention; and, FIG. 9 is a side view of the vehicle lighting switch of the present invention.
Figure 9:
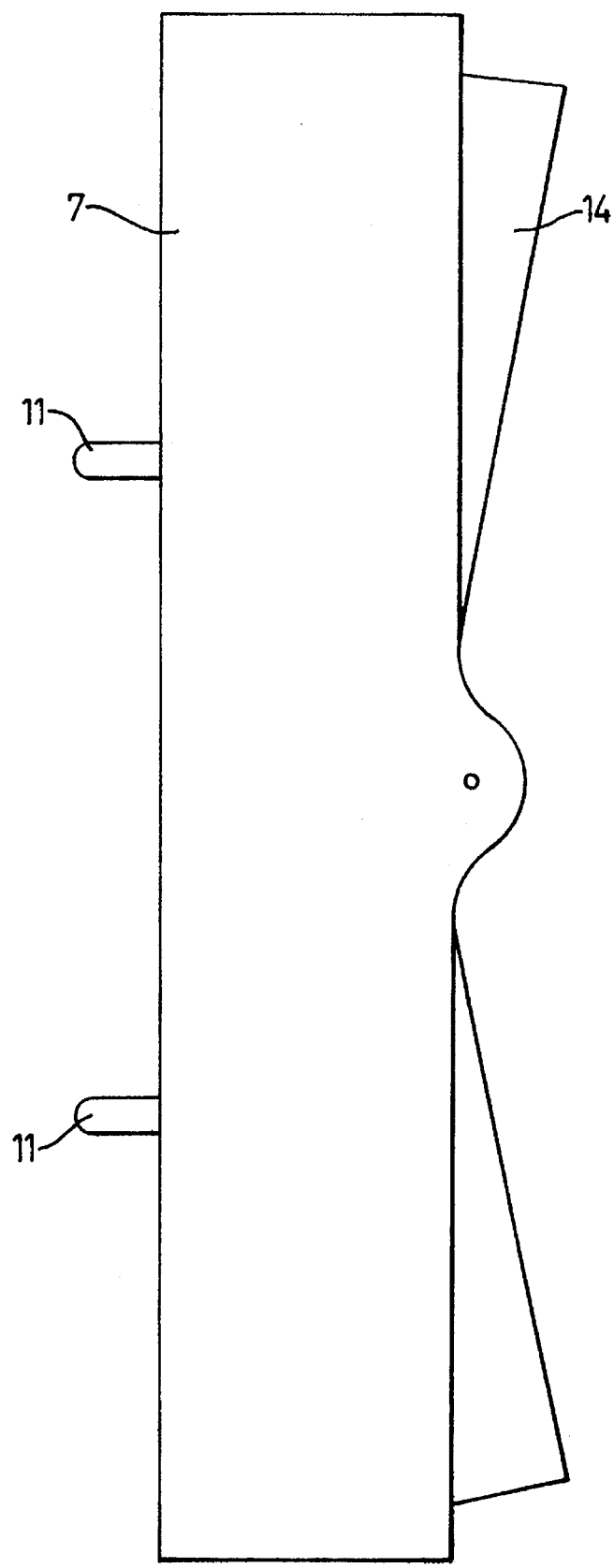

Referring first to FIG. 8, the lighting switch of the present invention, noted generally by the reference numeral 1, is designed for use in a vehicle lighting system that includes headlights 2, parking lights 3, an ignition switch 4, a storage battery 5, and wire means 6 which connect the lights, ignition switch and the battery together in the form of a circuit. FIG. 8 shows lighting switch 1 in a schematical drawing indicating the general manner in which it is connected to a vehicle's lighting system. Typically switch 1 would be mounted in a vehicle's dashboard.

Figure 1:
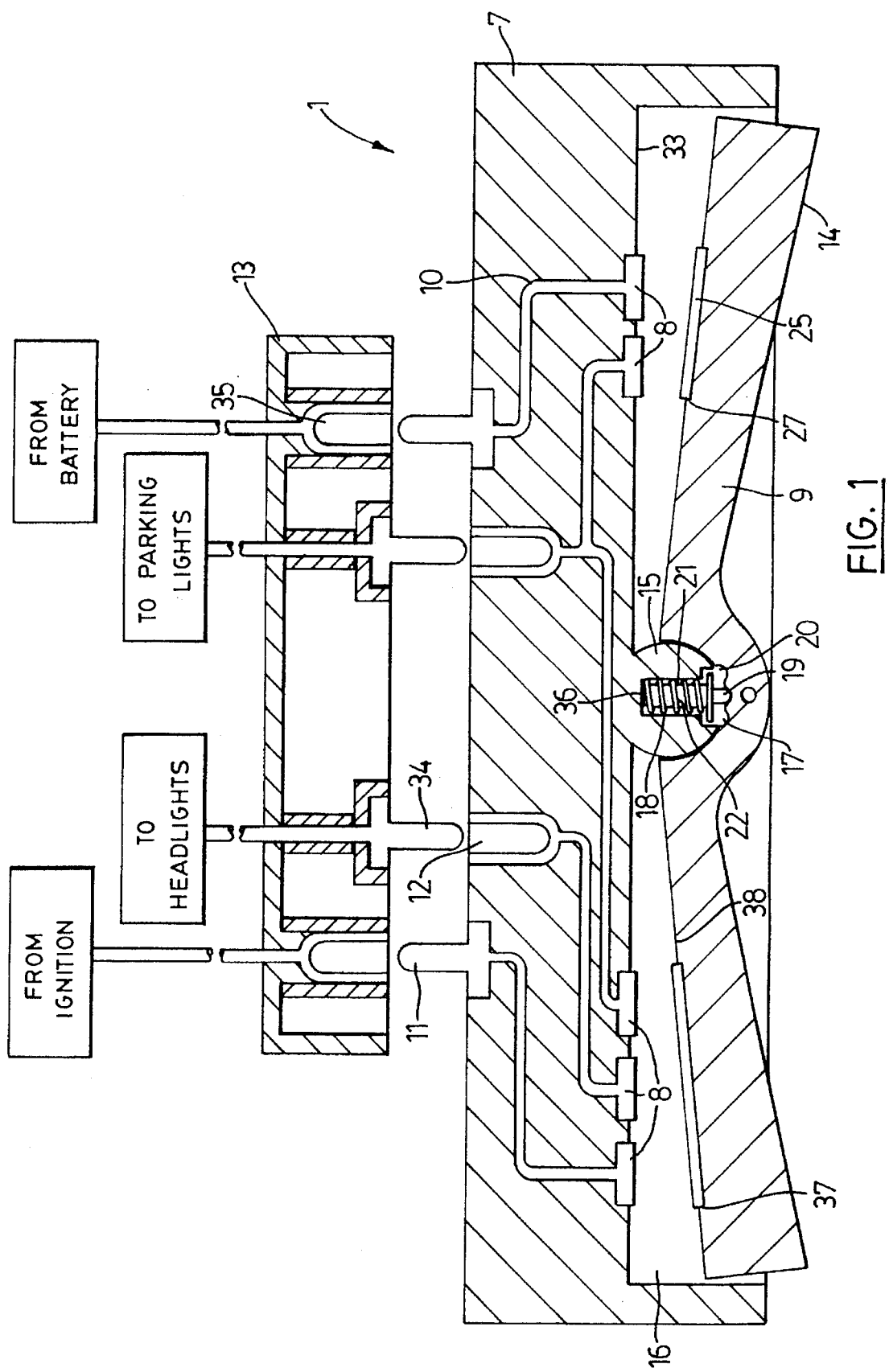
FIG. 1 is a side sectional view of the vehicle lighting switch of the present invention.

In the preferred embodiment, switch 1 has a structure as shown more clearly in FIG. 1. Lighting switch 1 is comprised primarily of a switch housing 7, a plurality of electrical contacts 8 and manually operable contact engaging means 9. As shown in FIG. 1, preferably 5 separate electrical contacts 8 are utilized with at least one separate electrical contact being connected or electrically bonded to each of the headlights 2, parking lights 3, ignition switch 4 and battery 5. The positioning and electrical bonding of contacts 8 is such that headlights 2 and parking lights 3 are both electrically isolated from each other and from ignition switch 4 and battery 5. Since in a vehicle lighting system the sources of electrical power to operate the headlights and parking lights originate with the vehicle's battery, or through the vehicle's ignition, this particular feature of switch 1 ensures that unless some form of electrical connection is made between contacts 8, electricity will not flow to either headlights 2 or parking lights 3 and they will remain in an off position.

In the embodiment of switch 1 shown in FIG. 1, electrical contacts 8 are mounted on the surface 33 of switch housing 7 such that during operation conducting means can be positioned across the respective contacts 8 in order to form an electrical connection for operation of headlights 2 and/or parking lights 3. The electrical connection of contacts 8 to the various other components in the vehicle lighting system is first accomplished through internal wiring or electrical conduction means 10 located within switch housing 7. Electrical conduction means 10 form a direct electrical connection from the rear of the switch housing 7 through to contacts 8 mounted on surface 33. Conduction means 10 may take the form of wires or may be solid metal strips or conductors, most preferably comprised of copper, aluminum or other metal or alloy having similar conductive characteristics.

In the preferred embodiment, switch housing 7 contains a series of posts 11 and receptacles 12 which are electrically conductive and are connected to contacts 8 by conduction means 10. Posts 11 and receptacles 12 are configured so as to mesh with corresponding electrically conductive posts 34 and receptacles 35 on a switch mounting plate 13. The corresponding posts 34 and receptacles 35 on switch mounting plate 13 are electrically connected to headlights 2, parking lights 3, ignition switch 4 and battery 5 by wire means 6.

It will be appreciated that the primary function of switch mounting plate 13 is to enable switch 1 to be readily and easily installed in a vehicle. In the typical installation of switch 1, mounting plate 13 is electrically connected to headlights 2, parking lights 3, ignition switch 4 and storage battery 5. Mounting plate 13 is then fastened or attached to switch housing 7 through plugging posts 11 and 34 into receptacles 12 and 35. At that point switch housing 7 may be fastened to the dash of a vehicle by any known method. It will be appreciated that the arrangement and relative positioning of posts 11 and 34 and receptacles 12 and 35 may be varied while accomplishing the same result and staying within the scope of the invention.

If necessary or desired screws, bolts or other fastening means can be used to secure mounting plate 13 to housing 7 or to secure housing 7 to the dash of a vehicle. The structure of switch 1 will thus enable housing 7 to be readily installed in a vehicle while also providing a means to easily remove and replace housing 7 if the internal mechanisms become damaged or need be replaced for some other reason. Once installed in this fashion, switch 1 will be secured within the dash of the vehicle and contacts 8 will be electrically bonded to the other components of the vehicle's lighting system as previously described.

It will also be appreciated by those skilled in the art that rather than using the post and receptacle form of connection as described and shown in the drawings, numerous other methods of electrically connecting switch 1 to the other components in the vehicle's lighting system could be employed. For example, wires from the headlights, parking lights, ignition switch and battery could be soldered directly onto lugs or terminals on the back of switch housing 1. Alternatively, various other types and forms of "plug-in" connection or terminals could be used, or the wires may merely be attached by placing their exposed ends under terminal screws. Furthermore, the use of switch mounting plate 13 could be dispensed with in which case connections for wires from the headlights, parking lights, ignition switch and battery would be made directly to the back of switch housing 7 by any of the above methods. Whichever method is employed to make these electrical connections, the important feature is that each of the headlights, parking lights, ignition switch and battery are connected to lighting switch 1 and that headlights 2 and parking lights 3 are electrically isolated from both one another and from ignition switch 4 and battery 5.

In the preferred embodiment the placement and configuration of contacts 8 are as shown in FIG. 1. In FIG. 1, five contacts are utilized. Headlights 2, ignition switch 4 and battery 5 each have a single contact electrically connected to them, while two separate contacts are electrically bonded to parking lights 3. The two contacts bonded to parking lights 3 are preferably connected by conduction means 10 to a single post or receptacle in housing 7 to simplify connection to the parking lights. It will be understood that connecting either of these two contact to a source of electricity will activate the parking lights. Alternatively, the two contacts bonded to parking lights 3 may be joined by a "jumper" positioned on the surface of the switch (see FIG. 4). In some cases the two contacts may even take the form of a single enlarged contact.

As also shown in FIG. 1 the five contacts 8 are positioned on surface 33 in two separate groups. The first group consists of the contact connected to battery 5 which is positioned adjacent to one of the contacts connected to parking lights 3. The second group comprises the contacts connected to headlights 2, ignition switch 4 and the second contact connected to parking lights 3. As shown, the two groups of contacts are positioned on surface 33 remote from one another such that all the contacts in one group may be readily bonded together by a single conductive plate without the plate touching the contacts of the other group. While what has been described is the preferred placement and connection for contacts 8, it will be appreciated that other placements and connections may be utilized while remaining within the scope of the present invention.

Referring again to FIG. 1, manually operable contact engaging means 9 has a first position, a second position and a third position and may be readily moved between said positions in order to operate switch 1. In the preferred embodiment manually operable contact engaging means comprises a rocker arm 14 which is pivotally attached to switch housing 7. The pivotal mount of rocker arm 14 on housing 7 comprises a ball and socket type mechanism, noted generally by reference numeral 15. This ball and socket type engagement allows rocker arm 14 to be pivotally received within recess 16 of switch housing 7.

Securing means 17 is used for holding manually operable contact engaging means 9 in its fist, second, or third position. Securing means 17 preferably comprises a spring actuated member 18 which forces an outwardly projecting nib 19 into one of three correspondingly shaped and sized recesses 20 in rocker arm 14. Recesses 20 are positioned with respect to nib 19 in such a manner that through receiving nib 19 in one of the recesses 20, manually operable contact engaging means 9 is held in either its first, second or third position. In FIG. 1, nib 19 is held within one of the recesses 20 such that manually operable contact engaging means 9 is held in its first position. Nib 19 is held within recess 20 through the action of a coil spring 21 upon a rod 22 on which nib 19 is surmounted. Coil spring 21 is compressed within a chamber 36 in housing 7 such that it pushes rod 22, and hence nib 14, outwardly and into one of the recesses 20.

Figure 2:
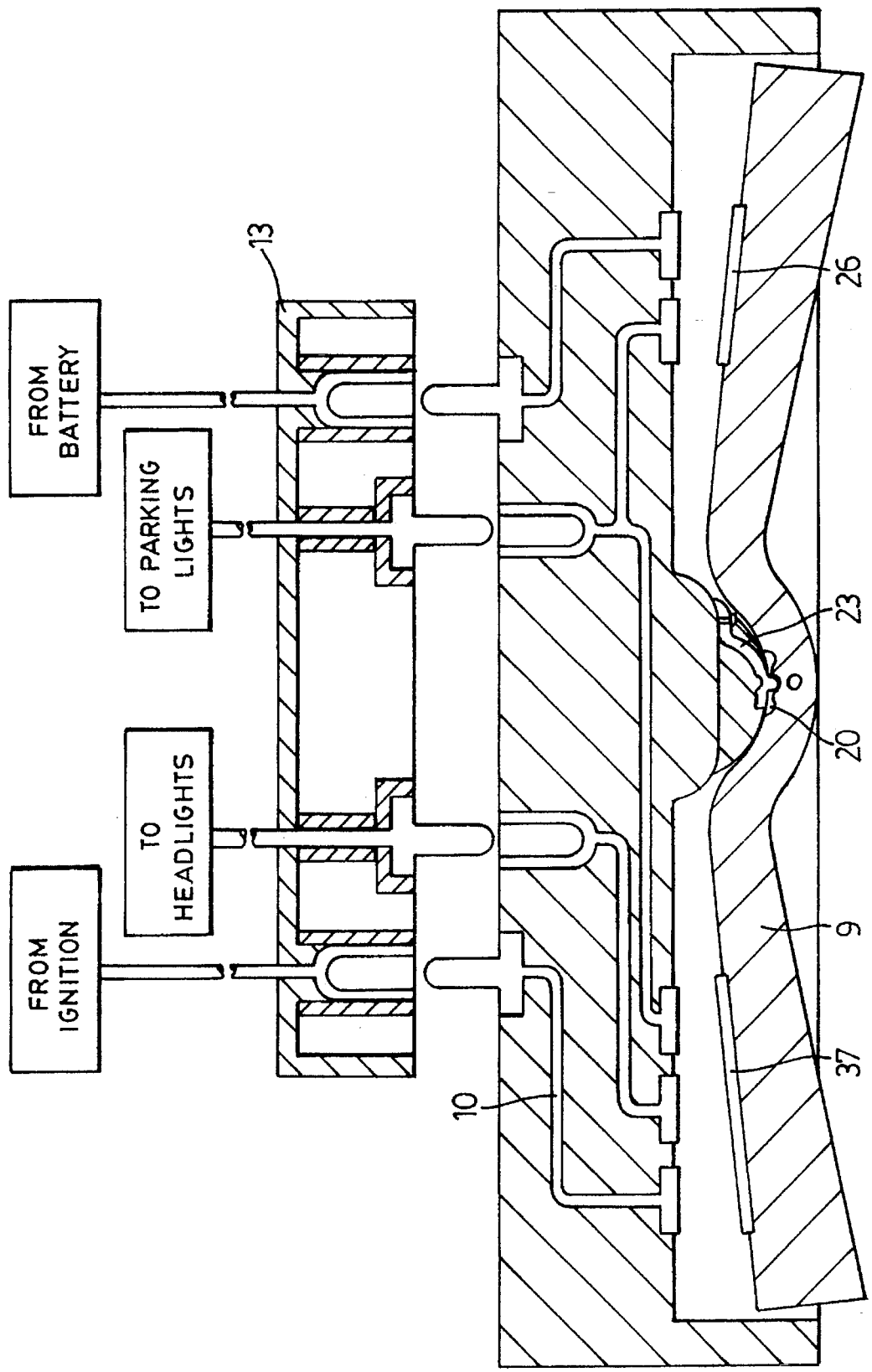
FIG. 2 is a side sectional view of an alternative embodiment of the switch of FIG. 1.
Figure 3:
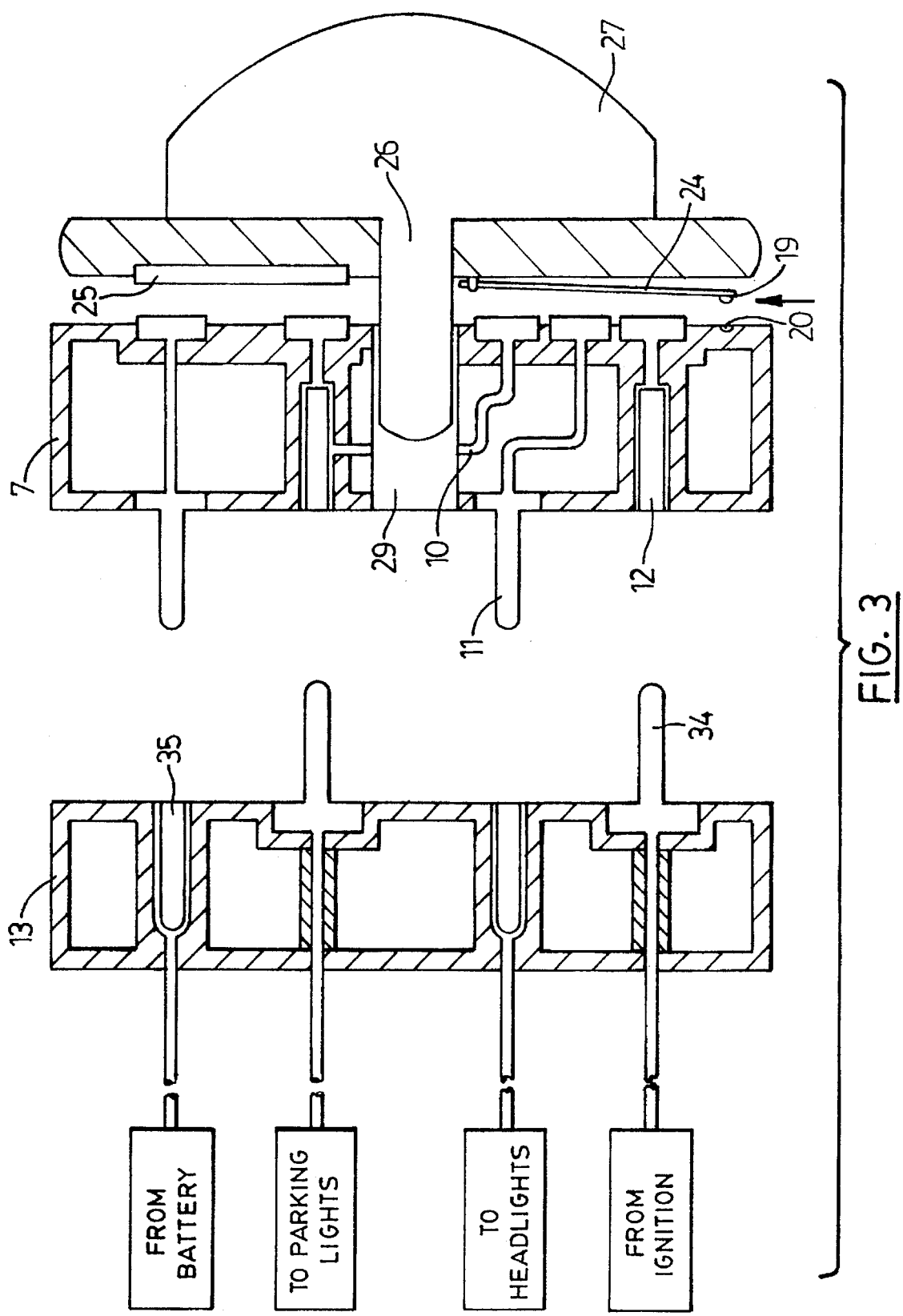
FIG. 3 is a side sectional view of a further alternative embodiment of the switch of FIG. 1.

In FIGS. 2 and 3, alternative embodiments of spring actuated member 18 are shown. In FIG. 2, nib 19 is positioned upon a leaf spring 23 which urges nib 19 into one of the recesses 20. In FIG. 3, a differently configured leaf spring 24 is mounted upon an alternate embodiment of manually operable contact means 9 and urges nib 19 into one of three recesses 20 positioned on switch housing 7.

Regardless of which of the three particular embodiments of spring actuated member 18 shown in FIGS. 1, 2, and 3 is employed the operation of manually operable contact engaging means and spring activated member 19 remains essentially the same. Through the urging of nib 19 into one of three recesses 20, manually operable contact engaging means 9 is held in either its first, second or third position. To move manually operable contact engaging means 9 from one of its positions to another it is only necessary to apply sufficient force to dislodge nib 19 from its resting point in one of the recesses 20. As manually operable contact engaging means 9 moves to one of its other positions, nib 19 is engaged to another one of the recesses 20 such that manually operable contact engaging means 9 is then held in place in the subsequent position. Those skilled in the art will realize that the holding of manually operable contact means 9 may also be accomplished by other means in addition to those described.

Referring again to FIGS. 1 and 2, as manually operable contact engaging means is. moved between its first, second and third positions, electrical connections between electrical contacts 8 will be made and broken by way of a conducting member 25 forming an electrical bond between respective electrical contacts 8. In the embodiments shown in FIGS. 1 and 2 conducting member 25, positioned on the inside face 38 of manually operable contact engaging means 9, comprises a pair of electrically conductive plates 26 and 37. Plates 26 and 27 are positioned with one at each end of rocker arm 14 such that they will form and break an electrical connection between respective groups of contacts 8 located on surface 33 when rocker arm 14 is moved between its first, second and third positions.

In operation, when manually operable contact engaging means 9 is in its fist position electrically conductive plates 26 and 27 are isolated from those electrical contacts 8 which are bonded or connected to ignition switch 4 or battery 5. In this fashion When an operator wishes to turn on only the parking lights, manually operable contact engaging means 9 is moved from its first position to its second position such that electrical energy is permitted to flow from battery 5 to parking lights 3 only, with headlights 2 being electrically isolated from battery 4. As shown in FIGS. 1 and 2 this is accomplished through movement of manually operable contact engaging means 9 such that conductive plate 26 comes into contact with those electrical contacts 8 which are connected to battery 4 and parking lights 3 (ie the upper group shown in FIG. 1). Due to the placement of contacts 8 as described previously, no connection is made between any source of electricity and the electrical contact 8 connected to headlights 2. In addition, since no electrical bonding is created with the electrical contact 8 connected to ignition switch 4, the source of electricity to power parking lights 3 will be battery 5. This will then enable an operator of the vehicle to turn the parking lights on without having to either start the vehicle or engage the ignition switch.

In most vehicles for safety purposes when the headlights are activated so are the parking lights. For this reason the switch of the present invention activates the vehicle's parking lights when the headlights are turned on. However, as discussed above, it is possible to activate the parking lights independently of the headlights by placing manually operable contact engaging means 9 in its second position.

To operate headlights 2, and hence also parking lights 3, manually operable contact engaging means 9 is moved into its third position thereby permitting electrical energy to flow through ignition switch 4 to headlights 2 and parking lights 3. When in its third position conductive plate 37 of manually operable contact engaging means 9 forms an electrical connection between the electrical contacts 8 which are bonded to ignition switch 4, headlights 2 and parking lights 3. Once again due to the placement of contacts 8 (see FIG. 1), no connection is made with the electrical contact forms an electrical connection between the electrical contacts 8 which are bonded to ignition switch 4, headlights 2 and parking lights 3. Once again due to the placement of contacts 8 (see FIG. 1), no connection is made with the electrical contact connected to battery 5. It will thus be appreciated that in order for the headlights and parking lights to be activated together, manually operable contact engaging means 9 must be in its third position and ignition switch 4 must be turned on. When in its third position manually operable contact engaging means 9 will not permit electricity to flow to headlights 2 or parking lights 3 directly from battery 5. In this fashion it is ensured that a vehicle's headlights are turned off immediately upon turning off the vehicle's ignition switch regardless of whether the motorist has remembered to switch off light switch 1. That is, when ignition switch 4 is off all sources of electricity are isolated from headlights 2.

Figure 4:
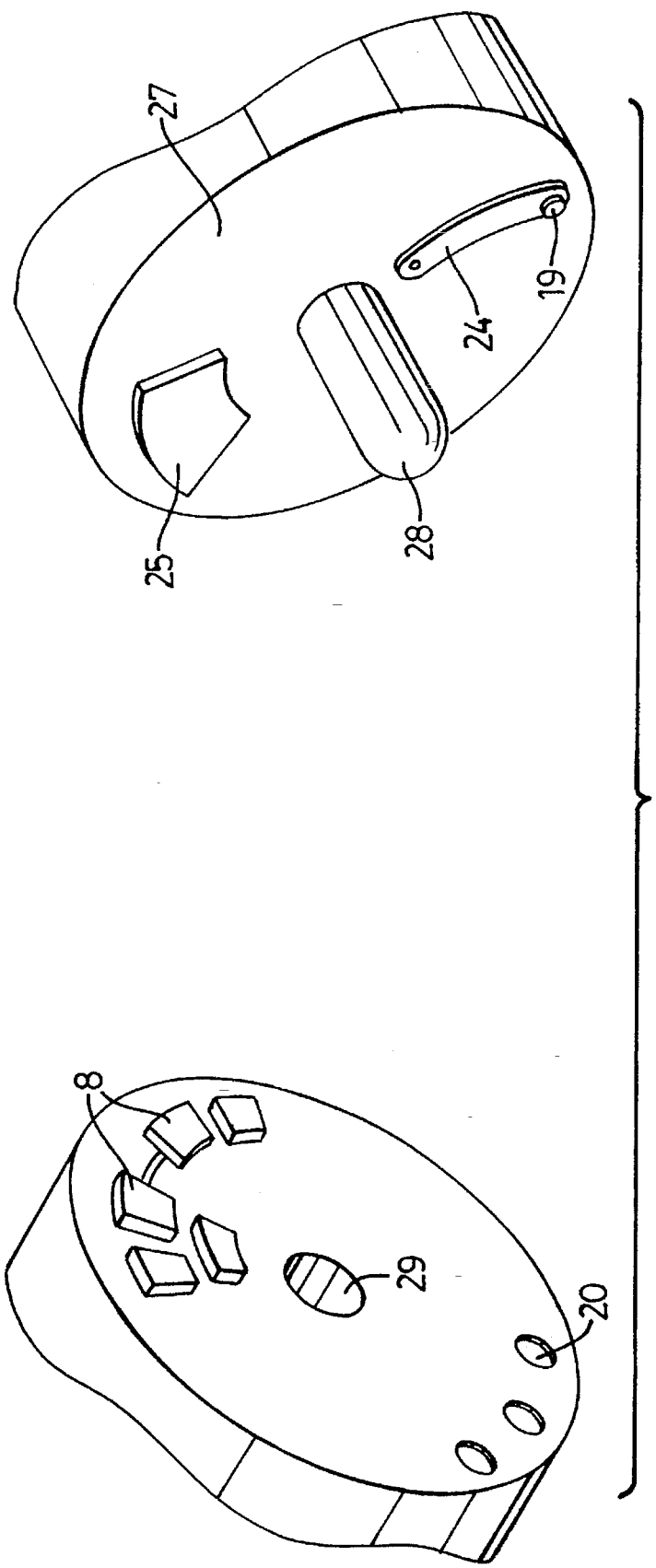
FIG. 4 is a perspective and exploded view of the embodiment shown in FIG. 3.

Referring briefly to FIGS. 3 and 4, an alternate embodiment of manually operable contact engaging means 9 is shown. In FIGS. 3 and 4 manually operable contact engaging means 9 comprises a rotary knob 27 which is rotationally attached to switch housing 7 by insertion of pin 28 into a central bore 29 within housing 7. In this embodiment movement of manually operable contact engaging means 9 from its first, second, and third positions is accomplished by manually rotating knob 27. Only a single electrically conductive plate 26 is required to form connection between the various electrical contacts 8 in the fashion as described above for activation of the parking and/or headlights of the vehicle (see FIG. 4).

Figure 5:
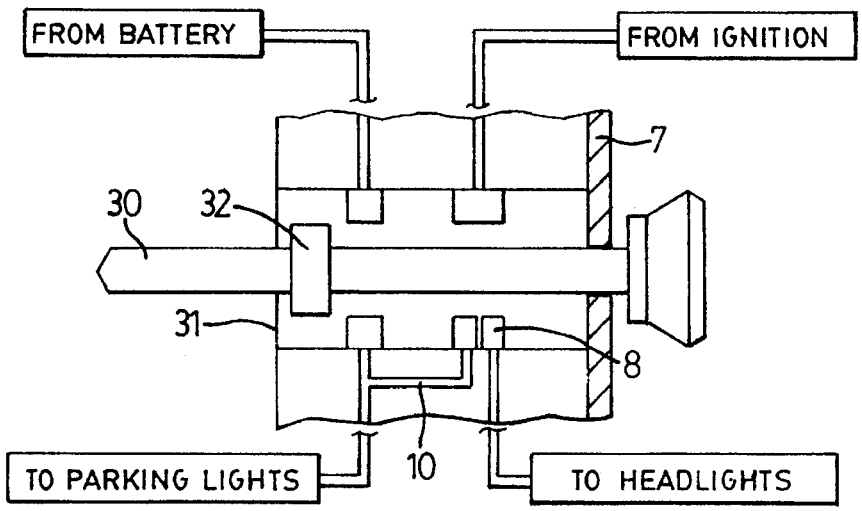
FIG. 5 is a sectional view of a further embodiment of the present invention wherein the switch is in a first position.
Figure 6:
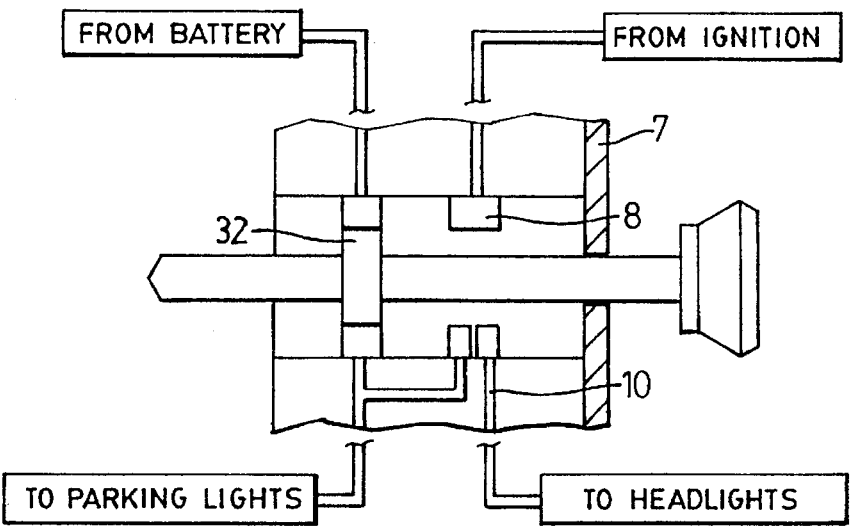
FIG. 6 is a sectional view of the embodiment shown in FIG. 5 wherein the switch is in a second position.
Figure 7:
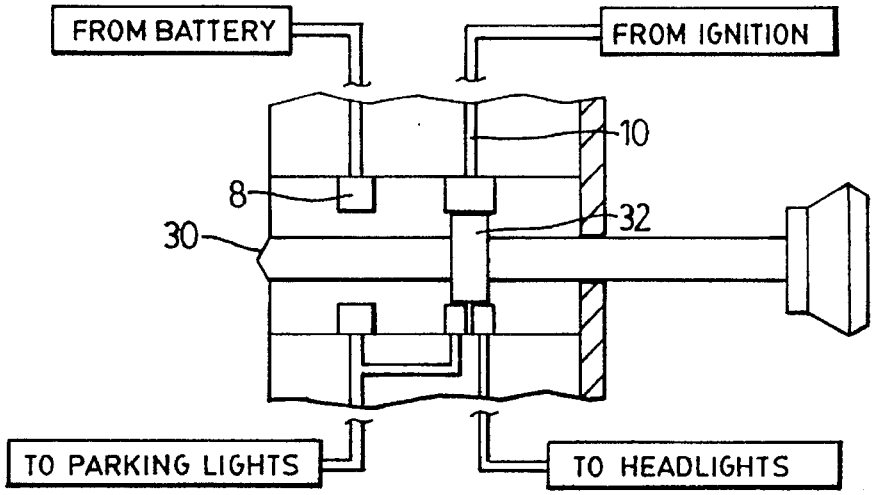
FIG. 7 is a sectional view of the embodiment shown in FIG. 5 wherein the switch is in a third position.

Still a further embodiment of manually operable contact engaging means 9 is shown in FIGS. 5, 6 and 7. Here manually operable contact engaging means 9 comprises a plunger 30 which is slidably held within a central bore 31 of switch housing 7. Here electrical contacts 8 are situated around central bore 31 as opposed to being positioned on the side of switch housing 7. Furthermore, rather than being an electrically conductive plate, conducting member 25 is preferably comprised of a conducting ring 32, which forms and breaks electrical connections between contacts 8 in an equivalent manner as described above, when plunger 30 is moved between its first, second, and third positions. Movement of plunger 30 results in the same electrical connections being formed and broken as described previously such that headlights 2 and parking lights 3 operate in the same manner. Finally, plunger 30 is held in its first, second or third position through frictional engagement with switch housing 7 and frictional engagement between conducting ring 32 and electrical contacts 8.

It is to be understood that what have been described are the preferred embodiments of the present invention and that it will be possible by those skilled in the art to vary from these embodiments while still staying within the scope and intent of the invention. For example, while particular types of spring actuated members have been described, other forms and types of securing means could equally be used. In addition, where manually operable contact engaging means 9 is comprised of a rocker arm it may also be held in its first, second or third position through frictional engagement with housing 7.

I claim:

1. A lighting switch for use in a vehicle lighting system, said vehicle lighting system including headlights, parking lights, an ignition switch, a storage battery and wire means connecting said lighting switch, headlights, parking lights, ignition switch and battery together in a circuit, the lighting switch comprising:

a switch housing, said switch housing being releasably secured to the dash of a vehicle through the use of a mounting plate that includes electrically conductive posts and receptacles that mesh with corresponding electrically conductive posts and receptacles on said switch housing to secure said switch housing to said mounting plate, said posts and receptacles forming part of the electrical circuit of said vehicle lighting system;

a plurality of electrical contacts on said switch housing, at least one separate electrical contact being electrically bonded to each of said vehicle headlights, parking lights, ignition switch and battery such that said headlights and said parking lights are electrically isolated from one another and from said ignition switch and said battery thereby preventing the flow of electricity between said headlights and said parking lights, between said headlights and said ignition switch and said battery, and between said parking lights and said ignition switch and said battery, except through the forming of electrical connections between said contacts; and, a three position manually operable contact engaging means having a first position, a second position and a third position, movement of said manually operable contact engaging means between said first, second and third positions creating and breaking electrical connections between said electrical contacts;

wherein said manually operable contact engaging means when in said first position prevents electrical energy from flowing to either said headlights or said parking lights, said manually operable contact engaging means when in said second position permits electrical energy to flow from said battery to said parking lights with said headlights being electrically isolated from said battery and said ignition switch, and said manually operable contact engaging means when in said third position permits electrical energy to flow from said ignition switch to both said headlights and said parking lights, said lighting switch thereby preventing the flow of electrical energy directly from said battery to said headlights such that electrical energy is only able to flow to said headlights when said manually operable contact engaging means is in said third position and said ignition switch is turned on thereby prohibiting the leaving of said headlights on when said ignition switch is turned off and the inadvertent discharge of the storage battery.

2. The lighting switch as claimed in claim 1 wherein said manually operable contact engaging means includes at least one electrical conducting member, said electrical conducting member being isolated from said electrical contacts bonded to either said ignition switch or said battery when said manually operable contact engaging means is in said first position.

3. The lighting switch as claimed in claim 2 wherein said electrical conducting member forms an electrical connection between said electrical contacts electrically bonded to said battery and to said parking lights when said manually operable contact engaging means is in said second position such that electrical energy is permitted to flow to said parking lights, said headlights being electrically isolated from said battery and said ignition switch.

4. The lighting switch as claimed in claim 3 wherein said electrical conducting member forms an electrical connection between said electrical contacts electrically bonded to said ignition switch, to said headlights and to said parking lights when said manually operable contact engaging means is in said third position such that electrical energy is permitted to flow through said ignition switch to said headlights and said parking lights.

5. The lighting switch as claimed in claim 4 wherein said manually operable contact engaging means is held in said first, second or third positions through frictional engagement with said switch housing.

6. The lighting switch as claimed in claim 4 having securing means for holding said manually operable contact engaging means in either said fist, said second or said third position.

7. The lighting switch as claimed in claim 6 wherein said securing means comprises a spring actuated member, said spring actuated member biased between said switch housing and said manually operable contact engaging means to hold said manually operable contact engaging means in either said first, second or third position.

8. The lighting switch as claimed in claim 7 wherein said manually operable contact engaging means comprises a rotary knob rotationally attached to said switch housing.

9. The lighting switch as claimed in claim 8 wherein said conducting member comprises an electrically conductive plate, said electrically conductive plate rotably engaging said electrical contacts, forming and breaking electrical bonds therebetween, when said rotary knob is moved between said first, second and third positions.

10. The lighting switch as claimed in claim 7 wherein said manually operable contact engaging means comprises a rocker arm, said rocker arm pivotally attached to said switch housing.

11. The lighting switch as claimed in claim 10 wherein said conducting member comprises a pair of electrically conductive plates, one of said conductive plates positioned at each end of said rocker arm.

12. The lighting switch as claimed in claim 4 wherein said manually operable contact engaging means comprises a plunger, said plunger slidably held within a central bore in said switch housing.

13. The lighting switch as claimed in claim 12 wherein said electrical conducting member is comprised of a conducting ring mounted on said plunger, said conducting ring slidably engaging said electrical contacts, forming and breaking electrical bonds therebetween, when said plunger is moved between said first, second and third positions.

* * * * *